(12) United States Patent
Whittenberger

(10) Patent No.: US 7,591,301 B2
(45) Date of Patent: *Sep. 22, 2009

(54) LOW-COST HIGH-TEMPERATURE HEAT EXCHANGER

(75) Inventor: William A. Whittenberger, Leavittsburg, OH (US)

(73) Assignee: Catacel Corp., Garrettsville, OH (US)

( * ) Notice: Subject to any disclaimer, the term of this patent is extended or adjusted under 35 U.S.C. 154(b) by 473 days.

This patent is subject to a terminal disclaimer.

(21) Appl. No.: 11/225,763

(22) Filed: Sep. 13, 2005

(65) Prior Publication Data

US 2007/0056717 A1 Mar. 15, 2007

(51) Int. Cl.
*F28D 9/00* (2006.01)
*B01J 8/02* (2006.01)
*B01J 19/24* (2006.01)

(52) U.S. Cl. ............... 165/165; 165/164; 165/166; 422/180; 422/222

(58) Field of Classification Search .......... 165/165
See application file for complete search history.

(56) References Cited

U.S. PATENT DOCUMENTS

| | | | |
|---|---|---|---|
| 2,216,864 A | 10/1940 | Wasmund | |
| D156,294 S | 11/1949 | Trow | |
| 2,553,030 A | 5/1951 | Bell | |
| D165,089 S | 11/1951 | McElgin | |
| 2,905,201 A | 9/1959 | McNaughton | |
| 2,963,783 A | 12/1960 | Field | |
| 3,059,563 A | 10/1962 | Larson | |
| 3,165,152 A | 1/1965 | Jones | |
| 3,734,177 A * | 5/1973 | Bellovary et al. ........... 165/166 |
| 3,847,211 A | 11/1974 | Fischel et al. | |
| 3,907,050 A | 9/1975 | Mullings | |
| 4,126,268 A | 11/1978 | Vitale | |
| 4,131,159 A | 12/1978 | Long | |
| D252,641 S | 8/1979 | LaZar | |
| D253,067 S | 10/1979 | Hartley | |
| D256,156 S | 7/1980 | Garritson | |
| D279,029 S | 5/1985 | Sieverding | |
| 4,605,060 A | 8/1986 | Andersson et al. | |
| 4,742,957 A | 5/1988 | Mentuch | |
| D297,044 S | 8/1988 | Van Ee | |
| D297,359 S | 8/1988 | Schmid et al. | |

(Continued)

FOREIGN PATENT DOCUMENTS

EP   0844454 A1   5/1998

(Continued)

*Primary Examiner*—Jennifer A Leung
(74) *Attorney, Agent, or Firm*—Pearne & Gordon LLP

(57) ABSTRACT

A low-cost, high-temperature heat exchanger is made from a notched piece of metal, the metal being folded back and forth upon itself to form a monolith. The notches in the metal piece create openings, communicating with distinct sides of the monolith. Ducts are attached to the openings. Cut pieces of corrugated metal, which may have a catalyst coating, are inserted between folds of the monolith. The heat exchanger may be used as part of a fuel cell system, or in other industrial applications, to recover waste heat, or to conduct various catalytic and non-catalytic reactions. The invention also includes an element, or building block, for a high-temperature heat exchanger, including a folded metal monolith with metal combs inserted, the monolith and the combs defining seams which are hermetically sealed.

20 Claims, 8 Drawing Sheets

U.S. PATENT DOCUMENTS

| | | |
|---|---|---|
| D319,499 S | 8/1991 | Hague |
| 5,282,507 A | 2/1994 | Tongu et al. |
| 5,311,930 A | 5/1994 | Bruenn |
| 5,398,752 A * | 3/1995 | Abbott ................ 165/171 |
| 5,538,293 A | 7/1996 | Kolt |
| 5,681,538 A * | 10/1997 | Sung et al. ............. 422/211 |
| 5,709,264 A | 1/1998 | Sweeney et al. |
| D398,049 S | 9/1998 | Willis |
| 5,893,408 A | 4/1999 | Stark |
| 6,059,023 A | 5/2000 | Kurematsu |
| 6,207,116 B1 | 3/2001 | Heed |
| 6,244,333 B1 | 6/2001 | Bergh et al. |
| 6,364,007 B1 | 4/2002 | Fischer |
| 6,408,941 B1 * | 6/2002 | Zuo .................... 165/165 |
| 6,919,055 B2 | 7/2005 | Kondo et al. |
| 6,920,918 B2 | 7/2005 | Knecht et al. |
| 6,920,920 B2 | 7/2005 | Whittenberger |
| 7,150,099 B2 | 12/2006 | Whittenberger et al. |
| 7,159,649 B2 * | 1/2007 | Thyrum et al. ............ 165/165 |
| 7,284,599 B2 | 10/2007 | Karoliussen |
| D560,276 S | 1/2008 | Whittenberger |
| 2005/0217836 A1 | 10/2005 | Whittenberger et al. |
| 2006/0048926 A1 | 3/2006 | Richter |
| 2006/0153755 A1 | 7/2006 | Obuchi et al. |
| 2007/0056164 A1 | 3/2007 | Whittenberger |
| 2007/0056717 A1 | 3/2007 | Whittenberger |
| 2008/0072425 A1 * | 3/2008 | Whittenberger et al. .. 29/890.03 |
| 2008/0164014 A1 | 7/2008 | Nakamura |

FOREIGN PATENT DOCUMENTS

| | | |
|---|---|---|
| GB | 2033570 A | 5/1980 |
| GB | 2158569 A | 11/1985 |
| JP | 55118598 A * | 9/1980 |
| WO | 8301998 A1 | 6/1983 |
| WO | 9924772 A1 | 5/1999 |
| WO | WO 03033133 A1 * | 4/2003 |

* cited by examiner

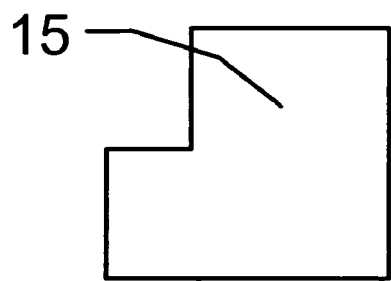
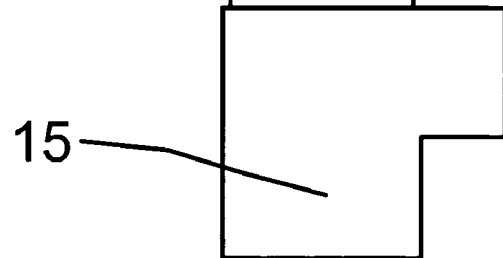
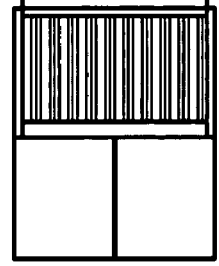
Fig.8a
Fig.8b
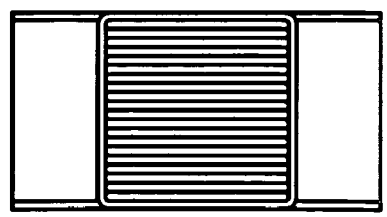
Fig.8c

LOW-COST HIGH-TEMPERATURE HEAT EXCHANGER

BACKGROUND OF THE INVENTION

This invention relates to the field of heat exchange. The invention provides a low-cost structure, capable of tolerating high operating temperatures, comprising a heat-exchanger or reactor such as is typically used in fuel processing or heat recovery for fuel cell systems.

In a fuel cell system, heat exchangers are typically provided to recover waste heat from a hot exhaust stream, typically 500-1000° C., and to transfer the recovered heat to one of the inputs to the system, such as fuel, air, or steam. In addition, heat exchangers that contain catalytic coatings are used as fuel processing reactors. Each system may have a unique configuration, but virtually all such systems can be made more efficient by the appropriate use of heat exchangers. In general, there is a need for a low-cost heat exchanger that can tolerate the above-described high-temperature environment, and which can be provided in large quantities, so that heat exchangers can be installed at multiple locations within a facility, at a reasonable cost. Such a heat exchanger has even more utility if one or more catalytic coatings can easily be applied to its working surfaces.

One way to limit the cost of a heat exchanger is to use a less expensive material in the manufacturing process. The use of metal foil materials, having a thickness in the range of about 0.001-0.010 inches, reduces expense by using less material overall. However, foil materials are difficult to seal or weld using conventional processes. Furnace brazing may be used to join certain high-temperature foil materials that contain nickel. Alloys that may be easily brazed include the 300 series stainless steel family (i.e. alloys known by the designations 304, 316, 321, etc.), the Inconel family (having designations 600, 601, 625, etc.), and other exotic alloys (Hastelloy-X and Haynes 230, for example). (Inconel is a trademark of Huntington Alloys Corp., of Huntington, West Va.) These brazable alloys are always expensive because they contain nickel. To limit the cost of material, it is highly desirable to use a high-temperature foil alloy that does not contain nickel.

A desirable choice is the product known as Fecralloy, which contains iron, chromium, and aluminum (Fecralloy is a now-cancelled trademark, formerly registered by the United Kingdom Atomic Energy Authority). Fecralloy is quite inexpensive, relative to other high-temperature alloys, but it is difficult to braze. Because Fecralloy contains aluminum, the application of heat causes aluminum oxide to form, making it difficult to seal the structure by brazing.

The above problem encountered with Fecralloy can be at least partly overcome by choosing a thicker material, and using a conventional welding process. But increasing the thickness of the material increases the cost of the product, and therefore offsets the cost advantage obtained by the choice of Fecralloy.

The heat exchanger of the present invention provides a solution to the above-described problems, by providing a high-temperature heat exchanger that is both effective and inexpensive. The present invention makes it economically feasible to place heat exchangers at multiple points in a fuel cell system. The present invention could also be used in other industrial applications, such as in chemical plants.

The heat exchanger of the present invention may also be used in a steam reforming process, in which hydrocarbons are converted to hydrogen, for use in operating a fuel cell. A steam reforming process is described in U.S. patent applications Ser. No. 10/211,083, Ser. No. 10/347,130, and Ser. No. 10/888,488, the disclosures of which are incorporated by reference herein. The above-cited applications show various uses of heat exchange, such as in conducting an endothermic steam reforming reaction on one side of a metal strip and an exothermic combustion reaction on the other side, or in conducting a water-gas shift reaction. In general, the operation of a fuel cell presents many situations in which heat from an exothermic reaction, or from a hot exhaust source, can be used to heat some other fluid stream.

The heat exchanger of the present invention is also compact, making it convenient for use in systems where a large amount of space is not available. The heat exchanger of the present invention also has the advantage of being hermetically sealed, so that there is virtually no possibility of leakage.

SUMMARY OF THE INVENTION

One aspect of the present invention is an element, or building block, for a heat exchanger, comprising a monolith formed of a piece of metal that has been folded back and forth upon itself, and a comb inserted into folds of the monolith, at or near the end of the monolith. The comb and the monolith are in contact along a plurality of seams, and these seams are hermetically sealed, preferably by laser welding. The heat exchanger element can be used to form a complete heat exchanger.

In another aspect, the present invention comprises a complete heat exchanger formed of a monolith made of a piece of metal, preferably a metal foil. The piece of metal foil has notches or cut-outs at opposite ends, and is folded back and forth upon itself to form the monolith, the notches or cut-outs defining openings which provide access to two distinct interior regions of the monolith. A duct-defining means is affixed to both ends of the monolith, at locations corresponding to the openings. The duct-defining means may include a comb having teeth which engage the folds of the monolith, a rectangular piece of metal, and a duct box which is inserted over the end of the monolith, the duct box including portions which, together with the rectangular piece and a spine of the comb, define a duct. A plurality of distinct pieces of corrugated metal, which may optionally be coated, or partially coated, with a catalyst, are inserted between folds of the monolith. The duct may be made fluid-impervious by sealing its joints, such as by brazing or by welding, and preferably by laser welding.

The monolith defines two sides, corresponding to the two sides of the original piece of metal that is folded to form the monolith. These sides define distinct fluid flow regions within the monolith. The two ducts, described above, provide fluid access to the two respective regions. Normally the metal defining the monolith is not coated with a catalyst, as such coating makes it difficult to weld or braze the structure. However, it is possible to coat the monolith, if necessary, such as by dip coating after the heat exchanger has been assembled.

The catalyst coating on the corrugated pieces inserted into one region of the monolith may be different from the coating on the pieces inserted into the other region. Thus, two different reactions can be conducted separately, in the two distinct regions within the monolith. The fluids flowing through the two ducts are not in direct fluid contact with each other, but are in heat exchange relationship, these fluids being separated by the folds of the monolith.

The invention also includes a method of making the above-described heat exchanger. The method begins with cutting notches into a flat piece of metal, on opposite sides of the piece, and folding the piece of metal back and forth to form a monolith. Next, one attaches combs to the ends of the monolith, by inserting the teeth of the combs into the monolith, so as to engage the folds. Next, one affixes rectangular pieces of metal to the monolith, near the ends. One then inserts duct boxes onto the ends of the monolith. The duct boxes include metal portions which, together with spines of the combs and the rectangular pieces, define complete ducts which provide fluid communication with the respective distinct interior regions of the monolith. A plurality of distinct corrugated pieces of metal are inserted into the spaces between folds of the monolith. The corrugated pieces may be entirely or partly coated with a catalyst. The ducts are preferably sealed by brazing or welding.

The present invention therefore has the primary object of providing a low-cost, high-temperature heat exchanger.

The invention has the further object of providing an element, or building block, for a low-cost, high-temperature heat exchanger.

The invention has the further object of providing a low-cost means of transferring heat in a fuel cell system or in an industrial plant.

The invention has the further object of providing a high-temperature heat exchanger which may be constructed of relatively inexpensive materials, using simple and economical construction techniques.

The invention has the further object of providing a low-cost, high-temperature heat exchanger which defines two distinct regions, wherein the heat exchanger can be used to conduct separate reactions in such regions.

The invention has the further object of providing a heat exchange structure which is easily coated with one or more catalytic materials to form a heat exchanging reactor.

The invention has the further object of making it economical to provide multiple heat exchangers at multiple locations in an industrial plant.

The invention has the further object of providing a method of making a low-cost, high-temperature heat exchanger.

The invention has the further object of providing a method of making an element, or building block, for a low-cost, high-temperature heat exchanger.

The invention has the further object of reducing the cost of providing heat exchange in a fuel cell system, or in an industrial plant.

The reader skilled in the art will recognize other objects and advantages of the invention, from a reading of the following brief description of the drawings, the detailed description of the invention, and the appended claims.

BRIEF DESCRIPTION OF THE DRAWINGS

FIG. 6b provides an elevational view of the structure of FIG. 6a, the monolith having been rotated by 90° relative to the structure of FIG. 6a.

FIG. 6c provides an end view of the monolith of FIG. 6a.

FIG. 8a provides an elevational view of the structure shown in FIG. 7b.

FIG. 8b provides an elevational view of the structure of FIG. 8a, the monolith having been rotated by 90° relative to the structure of FIG. 8a.

FIG. 8c provides an end view of the monolith of FIG. 8a.

DETAILED DESCRIPTION OF THE INVENTION

In its most basic form, the present invention comprises a heat exchanger which is constructed of relatively inexpensive, thin metal foil, rated for high temperatures, and in which the joints defined by the heat exchanger are sealed by laser welding. Laser welding makes it possible to use inexpensive, thin foil, while still providing a hermetically sealed structure. The foil used in the present invention preferably has a thickness in the range of about 0.001-0.010 inches, and a more preferred range of about 0.002-0.005 inches.

The invention also includes an element, or building block, for a heat exchanger, comprising a monolith formed of a piece of metal that has been folded back and forth upon itself. A comb is inserted into folds defined by the monolith, at or near an end of the monolith. The comb and the monolith are in contact along a plurality of seams, and these seams are hermetically sealed, preferably by laser welding or by other means. The heat exchanger element can be combined with other structures to form a complete heat exchanger, as will be described below.

Figure 1:
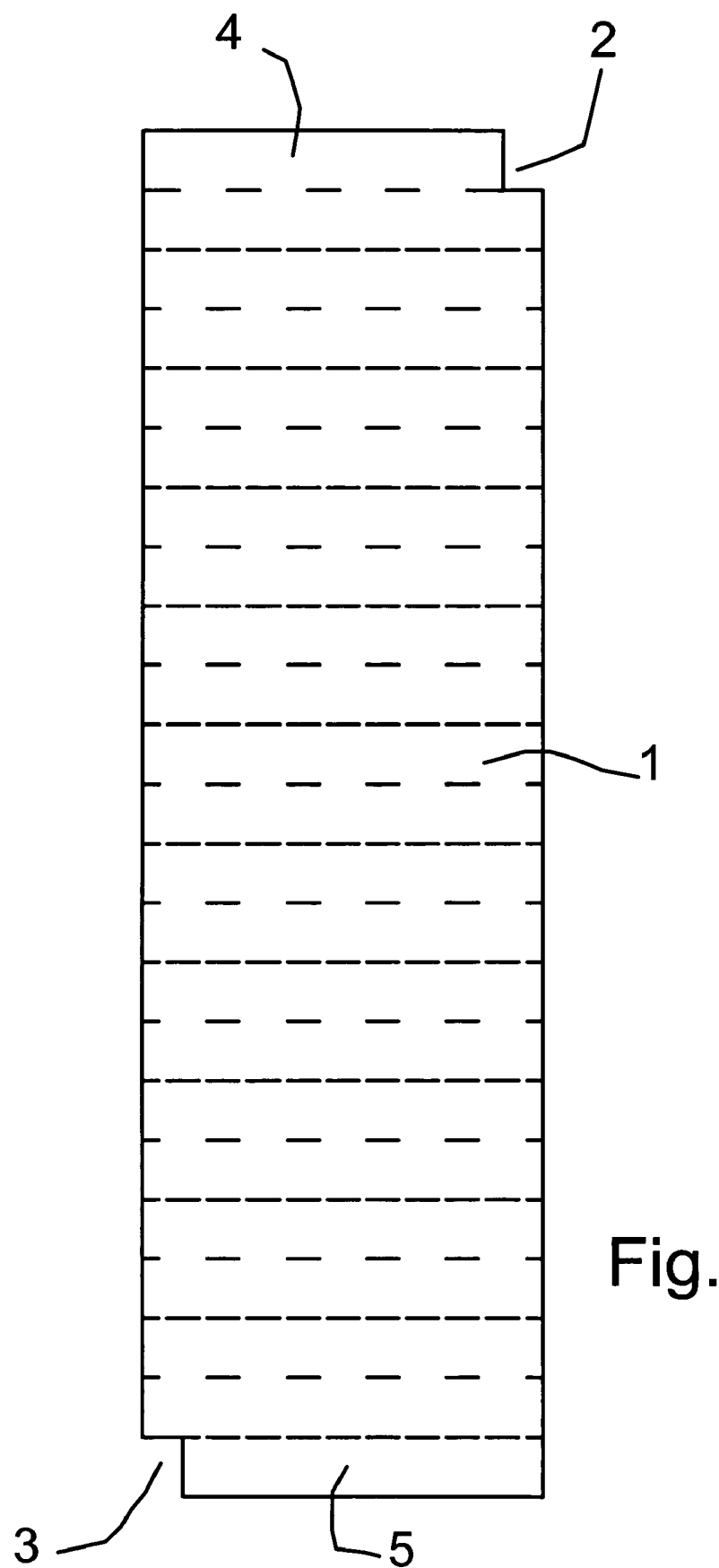
FIG. 1 provides a plan view of a piece of metal foil that has been prepared for fabrication into a heat exchanger of the present invention.

A first embodiment of a completed low-cost heat exchanger of the present invention is manufactured in the following way. First, as shown in FIG. 1, a flat, preferably rectangular, piece of metal foil 1 is prepared. Notches or cut-outs 2 and 3 are formed at opposite corners of the foil. The foil is to be folded back and forth upon itself, in a zigzag fashion, to form a monolith, the dashed lines indicating the locations of the folds. End flaps 4 and 5 will serve as a shell for the monolith, as will be described later.

The thickness of the foil is preferably chosen to be less than about 0.008 inches, so as to minimize the cost. The foil may be nickel-based, which is somewhat more expensive, or more preferably a lower-cost iron-based material such as that sold under the name Fecralloy.

Figure 2:
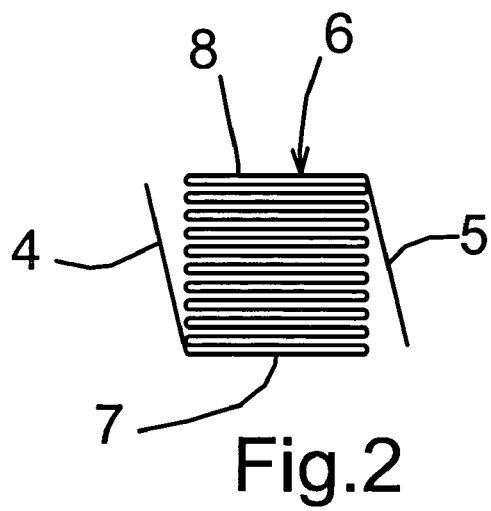
FIG. 2 provides an end view of the foil of FIG. 1, after the foil has been folded back and forth upon itself to define a monolith.
Figure 3:
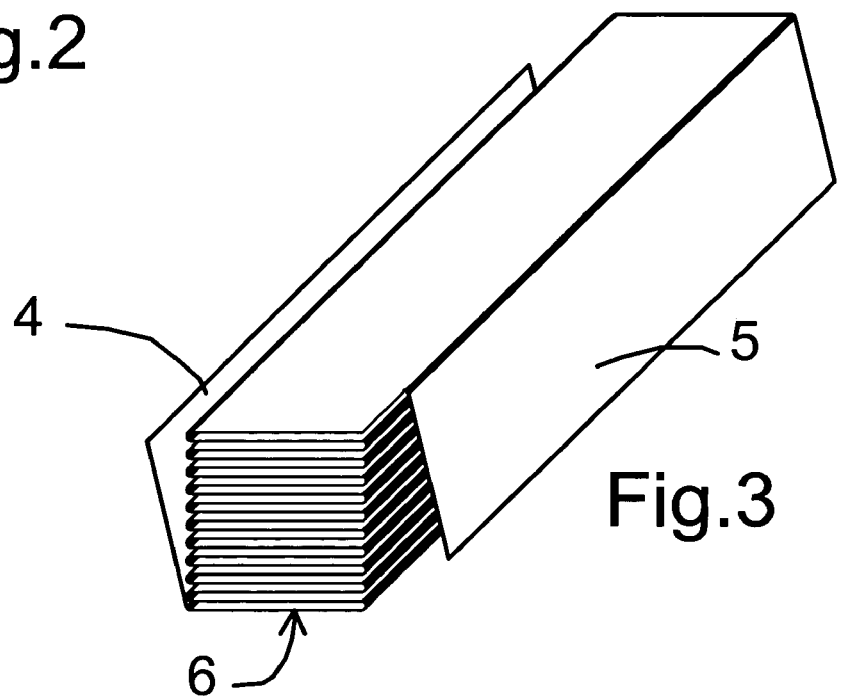
FIG. 3 provides a perspective view of the folded foil of FIG. 2.

FIGS. 2 and 3 illustrate the monolith 6 that is formed by folding the foil of FIG. 1. FIG. 2 shows an end view, and FIG. 3 shows a perspective view. FIGS. 2 and 3 clearly show the end flaps 4 and 5. The end flaps, together with the first and last folds 7 and 8, form a shell that encloses the monolith. The shell, as described so far, is incomplete, insofar as the notches or cut-outs 2 and 3 of FIG. 1 create openings which expose the interior regions of the monolith, as illustrated in FIG. 3.

Figure 4:
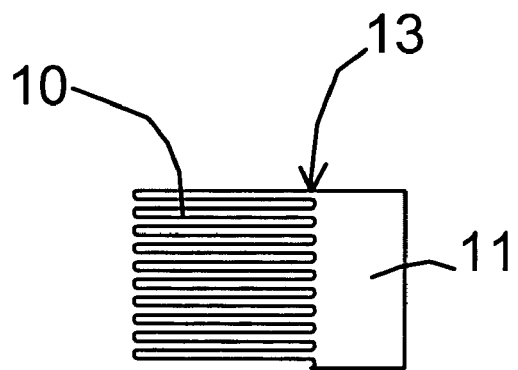
FIG. 4 provides a plan view of a comb which is used in making the heat exchanger of the present invention.

FIG. 4 shows a comb 13 which is to be inserted at the end of the monolith. Each monolith requires two combs, one at each end. The comb serves the purposes of anchoring the folds of the monolith, and of defining part of a duct connected to the monolith. The comb also holds the folds in spaced-apart relationship, facilitating the insertion of cut pieces of corrugated metal foil, as will be described later.

As shown in FIG. 4, the comb includes teeth 10 and spine 11. The spine later becomes a wall of the duct. The comb is preferably made of a material having a greater thickness than that of the foil. For example, and without limitation, the comb could be made of stainless steel, or other high-temperature alloys, having a thickness in the range of about 0.03-0.06 inches. The comb may be laser-cut from a sheet of metal, or it may be prepared in other ways.

Figure 5:
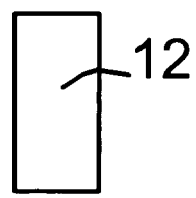
FIG. 5 provides a plan view of a rectangular piece of metal, used in the manufacture of the heat exchanger of the present invention.

FIG. 5 illustrates a rectangular piece of metal 12 which is used to form the wall of the duct which is opposite the wall defined by spine 11 of the comb. Each monolith requires two such rectangular pieces, one for each end.

Depending on the manner of use of the heat exchanger, the rectangular piece can be made of the same material, and having the same thickness, as the comb, or it can be made of thinner material. If the duct is to be welded to an external component, it is preferred that the rectangular piece be as thick as the spine of the comb. If the structure is to be brazed only, the rectangular piece could be of the same thickness as the body of the monolith, which is normally less than that of the spine of the comb.

Figure 6A:
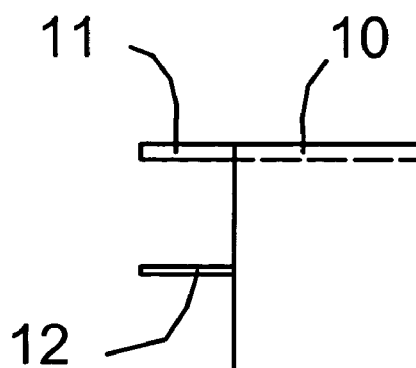
FIG. 6a provides an elevational view of the folded foil monolith of FIG. 3, and showing components forming ducts at each end.
Figure 6B:
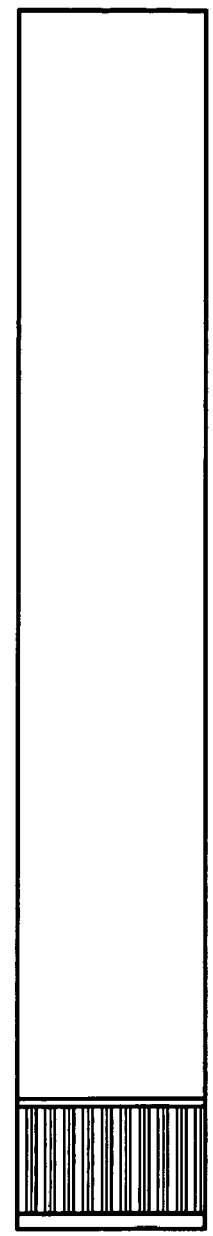
Figure 6C:
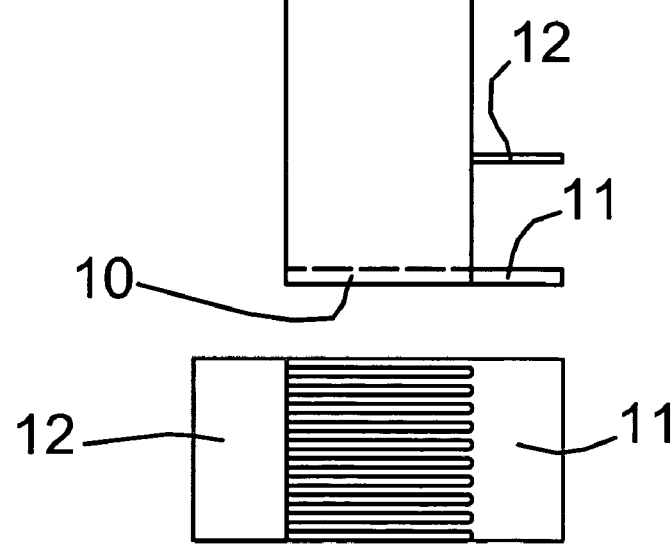

FIGS. 6a-6c illustrate the next step in the manufacture of a heat exchanger according to the present invention. FIG. 6a shows an elevational view of the monolith, with the combs inserted at both ends, and showing rectangular pieces 12 attached. Each comb is inserted such that its teeth 10 fit between alternate folds of the folded foil. The comb therefore anchors the folds, holding them in the desired spaced-apart position. FIG. 6a clearly shows how the rectangular piece 12 and the spine 11 of the comb together define opposing walls of a duct. The rectangular piece 12 is spaced from the end of the monolith by a distance which corresponds to the depth of the notches or cut-outs originally formed in the foil. FIG. 6b shows the same structure as FIG. 6a, rotated by 90°. FIG. 6c shows an end view, as seen from the bottom portion of FIG. 6a, illustrating the comb and also showing the rectangular piece 12 which is attached to the opposite end of the monolith.

Figure 7A:
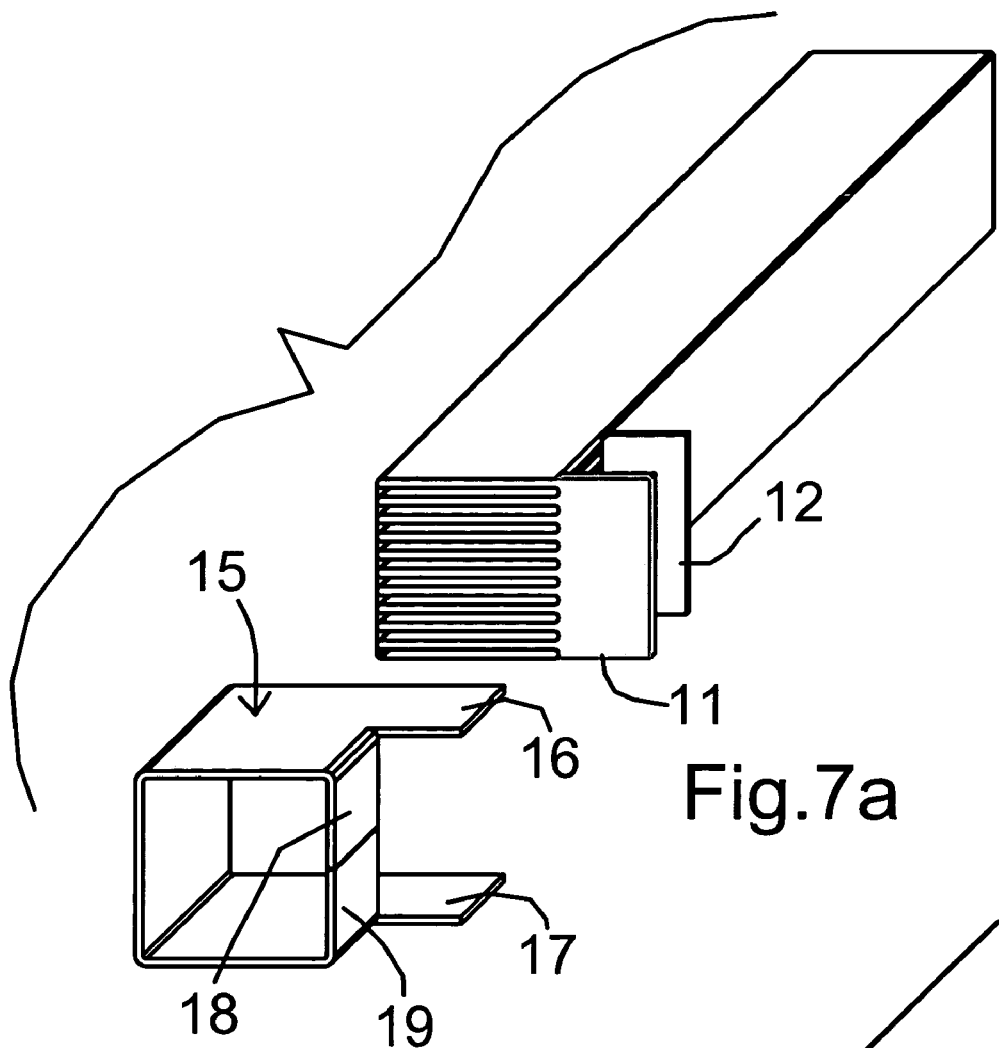
FIG. 7a provides an exploded perspective view showing a duct box before it has been installed over an end of the monolith forming the heat exchanger of the present invention.
Figure 7B:
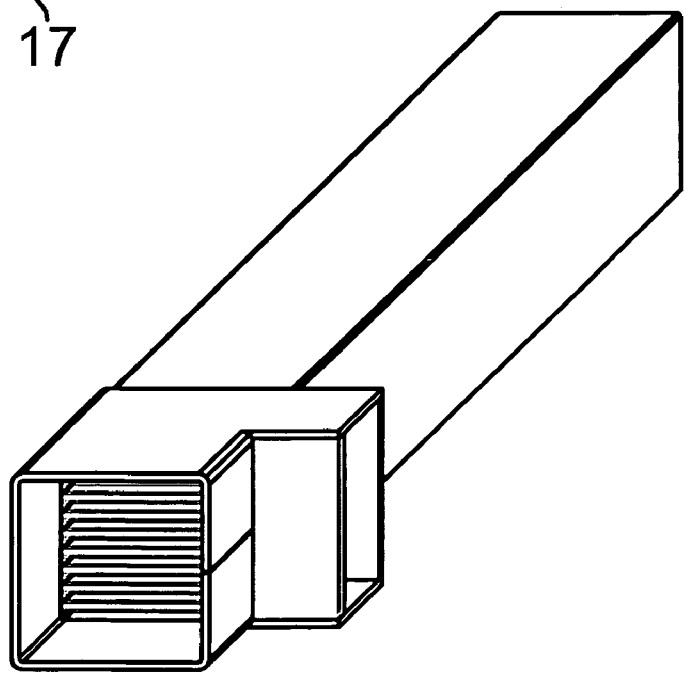
FIG. 7b provides a perspective view of the structures shown in FIG. 7a, showing the duct box installed over the end of the monolith.

The next step in the manufacture of a heat exchanger of the present invention is illustrated in FIGS. 7a and 7b. A duct box 15 is inserted over the ends of the monolith, as described below.

As shown in FIG. 7a, the duct box comprises a unitary structure having two contiguous parts, the first part defining a complete box with four walls, and the second part being open and having only three walls. In other words, the first part has portions 18 and 19 which are bent over to join each other, thus forming a wall of the box, but the second part has portions 16 and 17 which are not folded over, and which leave the second part of the box without a corresponding wall. The dimensions of the box are chosen such that the second part can snugly fit over the end of the monolith.

As the box is inserted over the end of the monolith, the bent portions 18 and 19 are stopped by the spine 11 of the comb, so that the box can be pushed in no farther. FIG. 7b illustrates the structure where the box has been fully inserted over the end of the monolith. Note that in FIG. 7b, the portions 16 and 17, together with the spine 11 of the comb and the rectangular piece 12, form a complete duct for providing fluid communication with an interior region of the monolith.

The thickness of the material used to make the duct box can be the same as the thickness of the spine of the comb, or it could be less. If the duct box is to be welded to an external component, it is more convenient to make it thicker, possibly of the same thickness as the spine of the comb. But if welding to an external component is not required, the duct box could be made of thinner metal.

FIGS. 8a-8c provide elevational and end views of the structure described with respect to FIGS. 7a and 7b. Thus, FIG. 8a shows duct boxes 15 installed at both ends of the monolith. FIG. 8b shows an elevation that is rotated by 90° relative to FIG. 8a. FIG. 8b therefore provides a view as seen when looking into the duct, and shows the exposed interior of the monolith. FIG. 8c provides an end view, as seen from the bottom of the structure of FIG. 8a.

Figure 9:
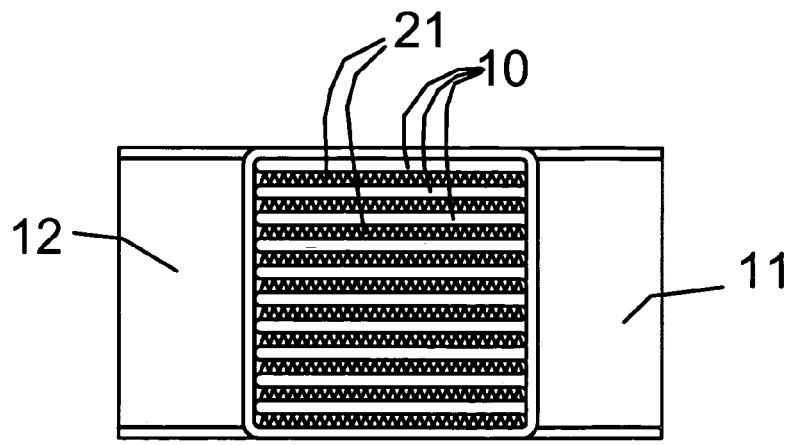
FIG. 9 provides an end view of the heat exchanger of the present invention, including the cut pieces of corrugated foil inserted within folds of the monolith.

FIG. 9 provides an end view of the monolith, showing a plurality of cut pieces of corrugated foil 21 inserted within the spaces defined by the folded foil. The insertion of cut pieces 21 is performed after the foil 1 has been folded into a monolith, and preferably after the combs, rectangular pieces, and duct boxes have been installed. The comb serves to facilitate the insertion of the cut pieces of corrugated foil, as it maintains the spacing between adjacent folds of the foil 1. FIG. 9 clearly shows the teeth 10 of the comb, inserted into the folds of the monolith. Note that half of the cut pieces must be inserted at one end, and the other half must be inserted from the other end. The reason for the latter is that the teeth of the comb block half of the channels. The channels blocked at one end are not blocked at the other end.

The cut pieces 21 can be inserted manually, one piece at a time. Alternatively, the cut pieces can be stacked in a magazine which holds them in the correct position, and the pieces can then be pushed simultaneously into the monolith.

The cut pieces 21 may be coated with a suitable combustion catalyst, or other catalyst, depending on the intended use of the heat exchanger. The cut pieces may be wholly or partially coated. However, the metal foil defining the monolith is normally not coated, as a coating would make it difficult to weld or braze. But if it were desired to coat the monolith, such coating could be done by dip coating the assembled structure.

Figure 10:
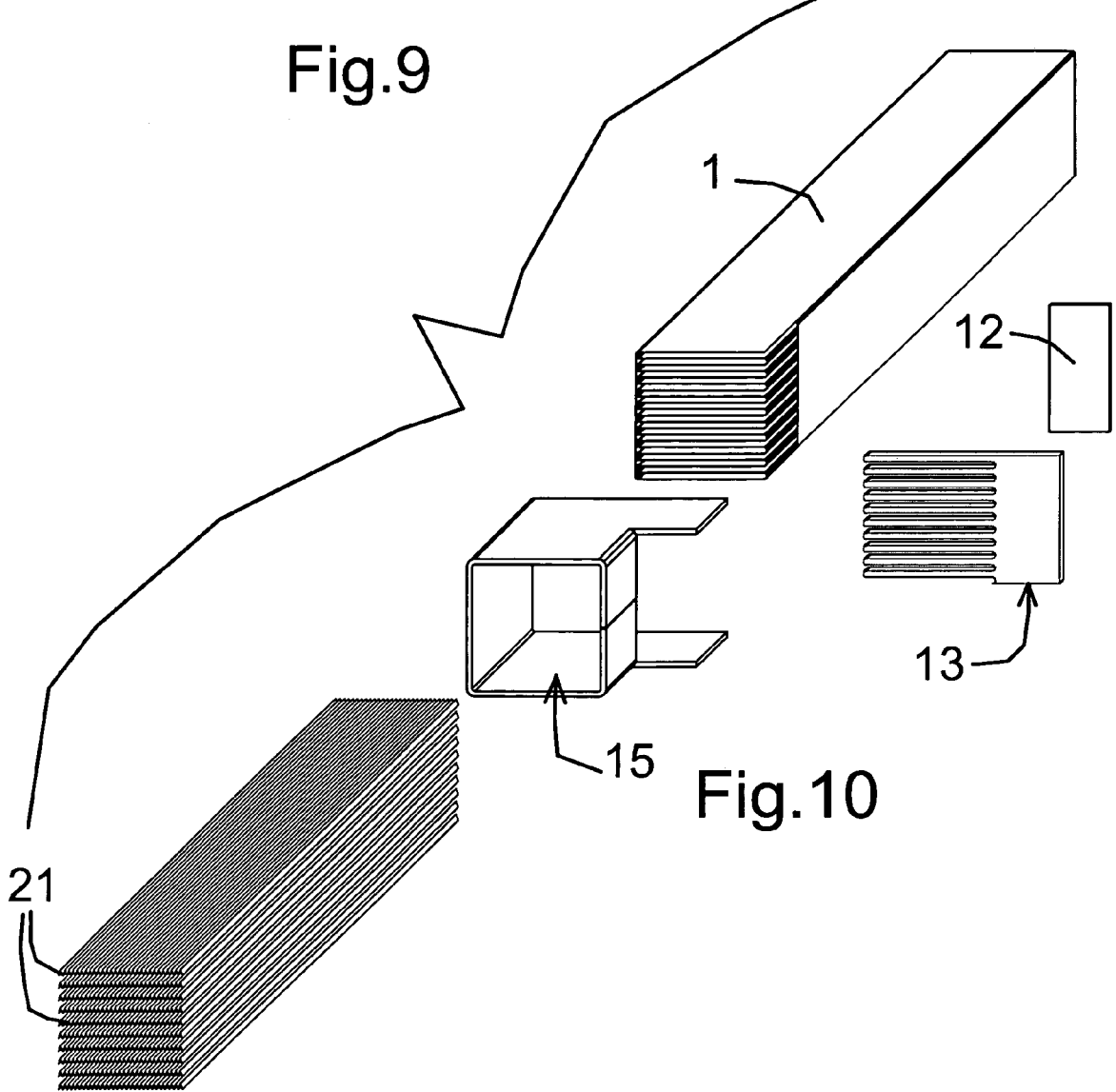
FIG. 10 provides an exploded perspective view, showing the various components of the heat exchanger of the present invention.

For convenience of illustration, the cut pieces of corrugated foil are not shown, except in FIGS. 9 and 10.

FIG. 10 provides an exploded perspective view which summarizes the construction of the heat exchanger of the present invention. The foil 1 is shown, after having been folded into a monolith, leaving openings for the ducts, defined by the notches or cut-outs described above. The figure clearly shows the monolith shell, defined by the flaps in the original piece of metal foil described above, and by the first and last folds of the monolith. The comb 13 is to be affixed to the end of the monolith, to hold the folds in spaced-apart relation, and to define a wall of the duct. The rectangular piece 12 is similarly attached to the monolith, to define the opposite wall of the duct. One then slides the duct box 15 onto the end of the monolith, until stopped by the spine of the comb. Finally, the cut pieces 21 of corrugated foil are inserted into the spaces between adjacent folds.

It is understood that, for each monolith, there will be a pair of combs, a pair of rectangular pieces, and a pair of duct boxes. Also, one should preferably prepare a sufficient quantity of cut pieces 21 to fill all of the available spaces in the monolith.

The foil used to make the cut pieces 21 can be very low-cost corrugated foil, which could be made of Fecralloy, having a thickness of the order of about 0.002 inches. In the figures, the cut pieces 21 are shown to define straight channels, but one could instead use a variety of channel configurations, such as wavy or skew corrugations, as are known in the heat exchange industry, to promote heat transfer.

The cut pieces, if coated with catalyst, can be coated on one side or both sides. As noted above, each side could be wholly or partly coated. Because both sides of a given cut piece will belong to the same fluid flow region of the monolith, it is preferred that, if a catalyst coating is used, the same catalyst should be used on both sides. But the invention is not limited to this configuration, and it is conceivable that different catalysts could be coated onto the two sides of the cut pieces.

The folded structure of the monolith inherently defines two sides, each side corresponding to a respective side of the original piece of metal foil. When the piece is folded to form a monolith, the monolith therefore defines two distinct fluid flow regions, corresponding to the two sides of the original piece. These two regions are not in direct fluid communication with each other, but are in heat exchange relationship, as heat can flow through the foil which separates the regions from each other. The two ducts provide access to the two respective fluid flow regions of the monolith. It is clear, therefore, that by placing a first catalyst on the cut pieces belonging to the first region, and a second catalyst on the cut pieces belonging to the second region, one can conduct two distinct reactions in the two regions of the monolith.

A process for making the low-cost heat exchanger of the present invention can be summarized as follows. First, one prepares the flat foil, with notches or cut-outs at the corners, and folds the foil back and forth upon itself to form the monolith. Next, one forms the combs, such as by laser cutting, and inserts a comb into each end of the monolith. Next, one forms a duct box for each end, and a rectangular piece, and one affixes the rectangular piece to the monolith, and one slides the duct boxes onto the ends. Next, one applies a brazing alloy to all joints on the resulting structure, and brazes the structure in a suitable furnace. Finally, one inserts the cut pieces of corrugated foil, which may or may not have a catalyst coating, into the spaces defined by the monolith.

For the above-described process to work most effectively, the foil must be a nickel-based alloy. For a heat exchanger rated up to about 7000° C., a 300 series stainless steel alloy, which is of medium expense, is preferred. For higher temperature ratings, the foil is preferably a relatively expensive nickel-based alloy, typically the alloy sold under the trademark Inconel. A preferred alternative, for all temperature ranges, is to use a relatively inexpensive iron-based foil, such as that sold under the name Fecralloy. In the latter case, before the duct boxes are installed, one would weld the joints where the foil defining the monolith meets the combs, preferably by laser welding. After installation of the duct boxes, the brazing alloy would be applied to the duct joints, not to all joints.

The invention can be practiced with yet another process which avoids brazing altogether. First, one prepares the foil, forming the notches or cut-outs in the corners, and folds the foil back and forth upon itself to define a monolith. Next, one prepares the combs, preferably by laser cutting, and inserts the combs into each end of the body. Next, using a laser welder, one welds the joints where the foil defining the monolith meets the combs. Next, one forms the duct boxes and rectangles, and installs them as described above. Next, one uses a laser welder to weld the duct joints. Finally, as described above, one inserts the cut pieces of corrugated foil, which may or may not be coated with a catalyst.

Figure 11:
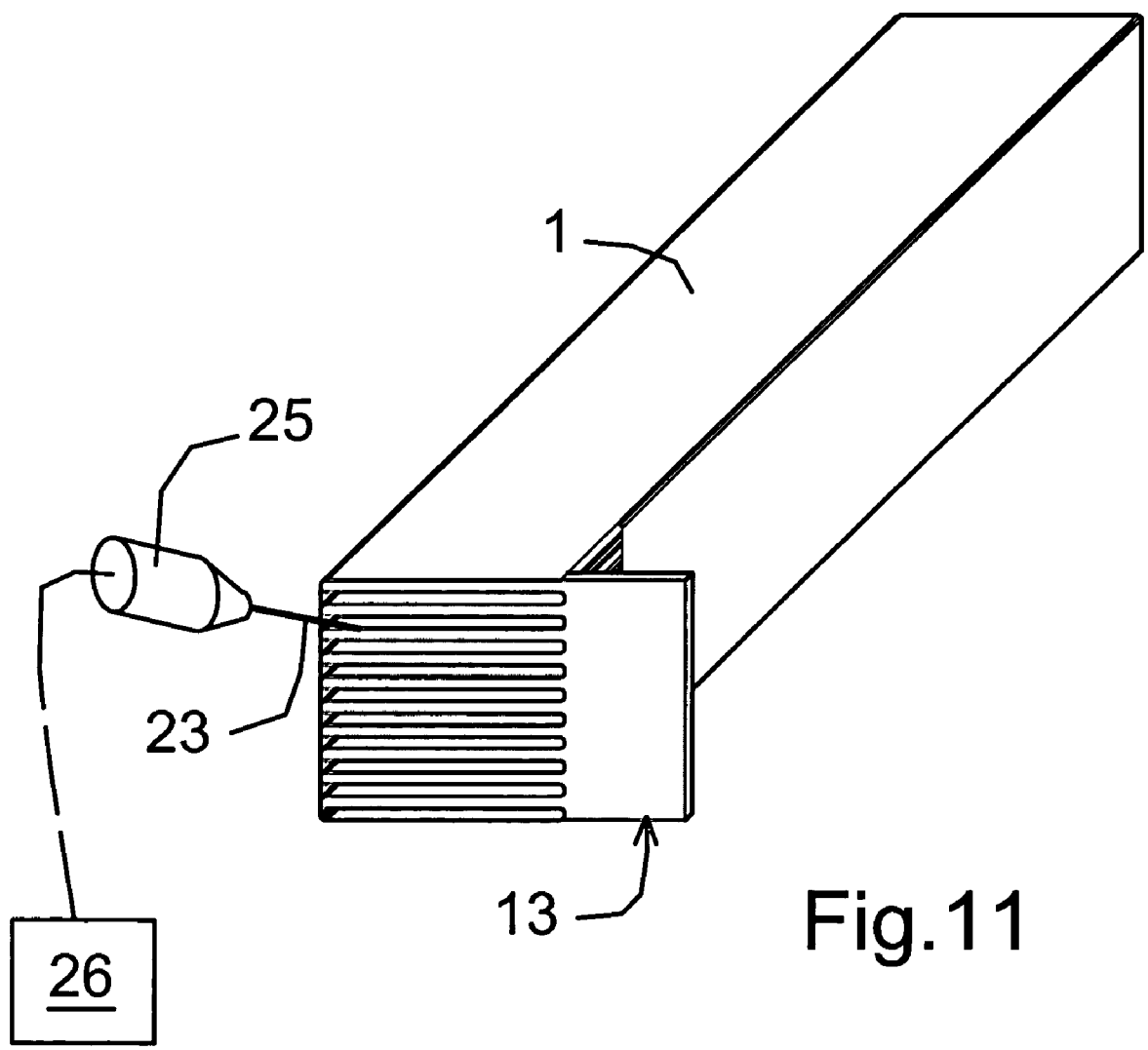
FIG. 11 provides a perspective view of a comb which has been inserted into the monolith of FIG. 3, and showing the joints being sealed by a laser welder.

FIG. 11 shows the use of a laser welding device for sealing the heat exchanger of the present invention. As shown in the figure, metal foil 1 has been folded into a monolith, and comb 13 has been inserted at one end. A laser welding machine includes computer-controlled device 26 which is programmed to control the orientation and power level of laser head 25. The device 26 is preferably capable of precisely positioning the laser beam with a multiple-axis control. A laser beam 23 is traced across all of the seams where the monolith meets the teeth of the comb. Heat from the laser beam causes the metal to soften or melt locally, and to form a fusion weld between the comb and the foil defining the monolith. The precise positioning of the laser beam enables the weld to be formed at all locations where the comb and the monolith meet. The result is a strong mechanical joint which also comprises a gas-tight seal.

The structure of the heat exchanger, as described above, can be varied, as described below.

Figure 12:
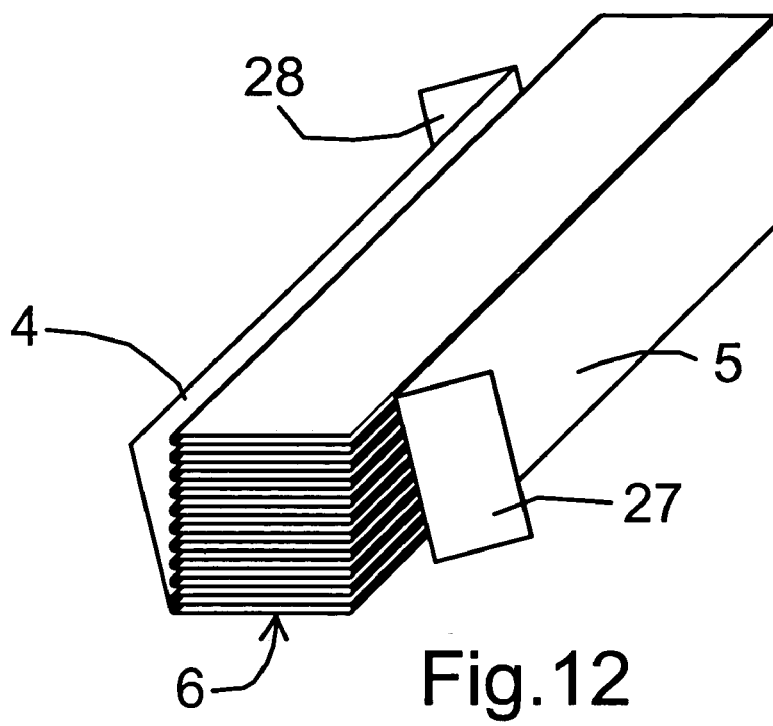
FIG. 12 provides a perspective view of an alternative embodiment of the monolith, wherein a single cut is made in each corner of the original piece of metal, and wherein wings are folded from the monolith to define part of a duct.

One alternative embodiment is illustrated in FIG. 12. Unlike the previous embodiment in which rectangular notches were formed by making two cuts at opposite corners of the flat metal foil, the embodiment of FIG. 12 uses only a single cut at such corners. The cut allows the formation of flaps 27 and 28, which are folded along a line which would have been the location of the other cut in the previous embodiment. The flaps 27 and 28 are positioned such they perform the function of the rectangular pieces 12 of the previous embodiment. The embodiment of FIG. 12 reduces the number of seams to be sealed, because the flaps 27 and 28 are integrally formed with the monolith.

Figure 13:
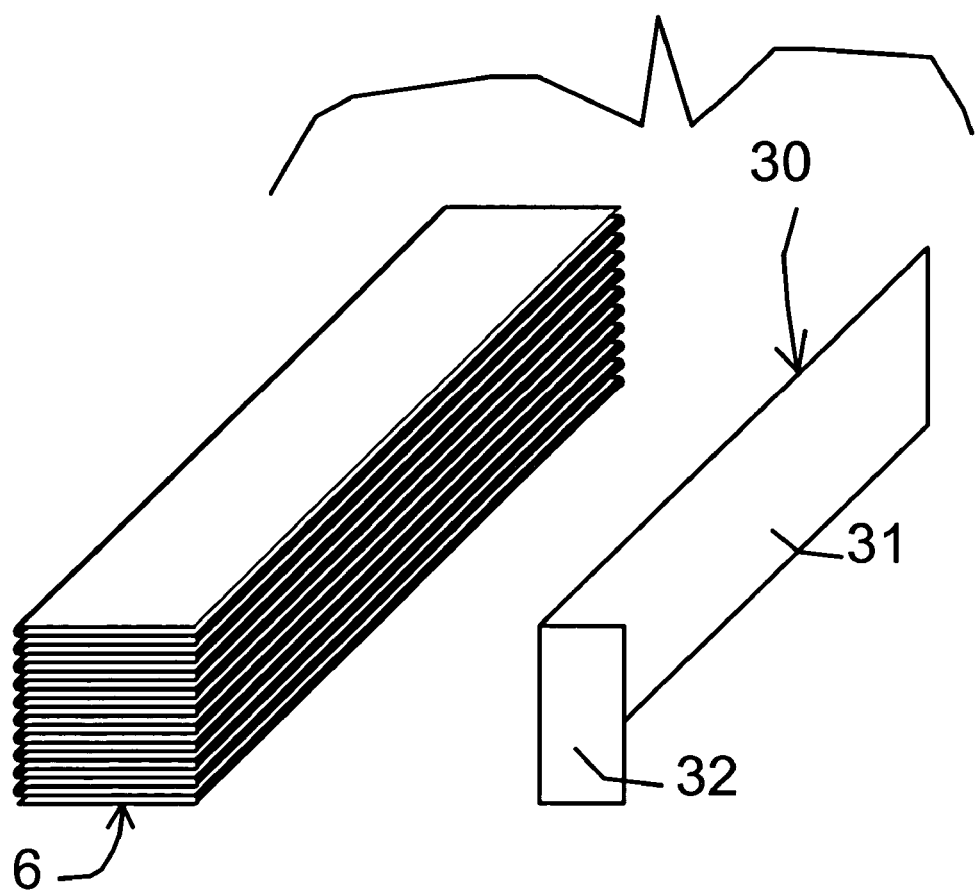
FIG. 13 provides a perspective view of another alternative embodiment, wherein the metal defining the monolith does not have notches or cuts, and wherein a separate piece of metal is used to cover the monolith and to define part of a duct.

FIG. 13 shows another alternative embodiment. In this embodiment, no notches or cuts are made in the foil defining the monolith 6. Instead, separate side cover pieces 30 are made for each side of the monolith. The cover pieces are made from foil, which may be the same as that used to make the monolith, or which may be made of thicker material. The cover piece includes a side panel 31 and a flap 32. The side panel is joined to the monolith, preferably by welding, and the flap 32 performs the function of rectangular piece 12 of the first embodiment.

For simplicity of illustration, FIGS. 12 and 13 do not show the duct boxes or the cut corrugated pieces. It is understood that such components, as described with respect to the previous embodiments, would be included in the complete heat exchanger.

The invention can be modified in other ways, which will be apparent to the reader skilled in the art. For example, the construction of the ducts, at or near the ends of the monolith, can be accomplished in different ways. In the above description, the duct boxes, combs, and rectangular pieces comprise means for defining the ducts. The components could be varied, as long as the ducts are constructed to convey fluid, sealed from the outside, into or out of the appropriate portion of the monolith.

The order of the steps of the assembly of the heat exchanger can be varied somewhat. For example, it is not necessary to prepare the combs 13 before the rectangular pieces 12; instead, the order of these two steps could be reversed.

The above and other modifications, which will be apparent to the reader skilled in the art, should be considered within the spirit and scope of the following claims.

What is claimed is:

1. A heat exchanger, comprising:
   a) a monolith formed of a piece of metal that has been folded back and forth upon itself, the piece of metal having a notch which provides access to an interior region of the monolith when the metal has been folded,
   b) a comb inserted into folds of the monolith, in a vicinity of an end of the monolith, the comb having a spine,
   c) a rectangular metallic piece, the rectangular piece being attached to the monolith and being spaced apart from the comb,
   d) a duct box which is fitted over an end of the monolith, the duct box including a pair of opposing portions which, together with the spine of the comb and the rectangular piece, define a duct which provides fluid communication with said interior region, and
   e) a plurality of cut pieces of corrugated metal, the cut pieces being located in spaces defined by folds of the monolith.

2. The heat exchanger of claim 1, wherein at least some components of the heat exchanger define seams, and wherein the seams are hermetically sealed by laser welding.

3. The heat exchanger of claim 1, wherein the cut pieces are coated with a catalyst.

4. The heat exchanger of claim 1, wherein the duct box comprises a unitary structure having first and second parts, the first part defining a complete box with four walls, and the second part being open and defining said opposing portions.

5. The heat exchanger of claim 1, wherein the duct is positioned at a location which corresponds with the notch formed in the piece of metal defining the monolith.

6. The heat exchanger of claim 1, wherein the monolith defines two distinct interior regions, and wherein there are two ducts, the ducts providing fluid communication with respective interior regions.

7. A heat exchanger, comprising:
   a) a monolith formed of a piece of metal that has been folded back and forth upon itself, the monolith defining first and second sides which are not in direct fluid communication with each other, the monolith defining first and second openings providing fluid access to said first and second sides, respectively, said piece of metal having notches which define said openings,
   b) a first duct adjacent to and in fluid communication with said first opening, and
   c) a second duct adjacent to and in fluid communication with said second opening, said first side defining a first series of fluid flow channels which are blocked adjacent said first opening by teeth of a first comb and which are unblocked at the other end, said second side defining a second series of fluid flow channels which are blocked adjacent said second opening by teeth of a second comb and which are unblocked at the other end.

8. The heat exchanger of claim 7, wherein at least some components of the heat exchanger define seams, and wherein the seams are hermetically sealed by laser welding.

9. The heat exchanger of claim 7, wherein said ducts are at least partially defined by duct boxes affixed to ends of the monolith.

10. The heat exchanger of claim 7, wherein said notches are rectangular notches which define said openings.

11. The heat exchanger of claim 7, wherein the piece of metal has at least one single cut, the single cut defining a flap which is folded to form a wall of one of said ducts.

12. The heat exchanger of claim 11, wherein the piece of metal has a pair of single cuts, disposed at diagonally opposite corners of the piece of metal, and wherein there are two flaps folded to form walls of ducts located at opposite ends of the monolith.

13. The heat exchanger of claim 7, wherein cut pieces of metal are located in said first series of fluid flow channels, the cut pieces being at least partially coated with a catalyst.

14. The heat exchanger of claim 7, wherein the piece of metal is 0.001-0.010 inches thick.

15. The heat exchanger of claim 7, wherein said first comb has a spine which defines a sidewall of said first duct.

16. A heat exchanger comprising a monolith formed of a piece of metal that has been folded back and forth upon itself, the monolith defining first and second sides which are not in direct fluid communication with each other, the monolith defining first and second openings providing fluid access to said first and second sides, respectively, said piece of metal having a notch which provides access to an interior region of the monolith, said first side defining a first series of fluid flow channels which are blocked adjacent said first opening by teeth of a first comb and which are unblocked at the other end, said second side defining a second series of fluid flow channels which are blocked adjacent said second opening by teeth of a second comb and which are unblocked at the other end.

17. The heat exchanger of claim 16, further comprising a first duct adjacent to and in fluid communication with said first opening.

18. The heat exchanger of claim 17, wherein said first comb has a spine which defines a sidewall of said first duct.

19. The heat exchanger of claim 16, further comprising a plurality of cut pieces of metal located in said first series of fluid flow channels, the cut pieces being at least partially coated with a catalyst.

20. The heat exchanger of claim 17, wherein the piece of metal has at least one single cut, the single cut defining a flap which is folded to form a wall of said first duct.

* * * * *

UNITED STATES PATENT AND TRADEMARK OFFICE
CERTIFICATE OF CORRECTION

PATENT NO. : 7,591,301 B2  Page 1 of 1
APPLICATION NO. : 11/225763
DATED : September 22, 2009
INVENTOR(S) : William A. Whittenberger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this

Twenty-first Day of September, 2010

David J. Kappos
*Director of the United States Patent and Trademark Office*